A. A. MARTELL.

TOOL FOR ALINING AND FINISHING SHAFT BEARINGS AND THE LIKE.

APPLICATION FILED MAR. 13, 1917.

Reissued June 5, 1917.

14,311.

2 SHEETS—SHEET 1.

Inventor:
Albert A. Martell
by Ramsey and Parmelee
Attys.

THE NORRIS PETERS CO., PHOTO-LITHO., WASHINGTON, D. C.

A. A. MARTELL.
TOOL FOR ALINING AND FINISHING SHAFT BEARINGS AND THE LIKE.
APPLICATION FILED MAR. 13, 1917.
Reissued June 5, 1917. 14,311.
2 SHEETS—SHEET 2.
Fig. 3.
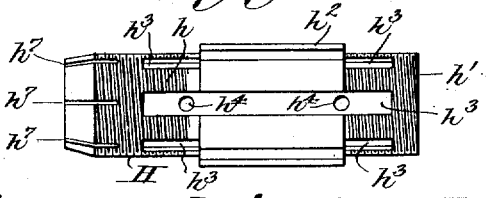
Fig. 4.
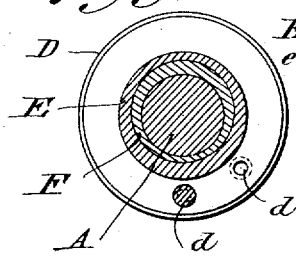
Fig. 5.
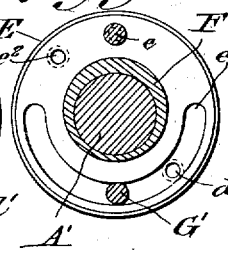
Fig. 6.
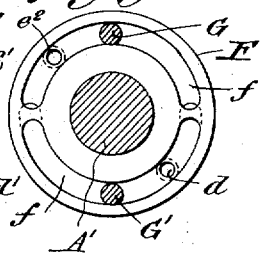
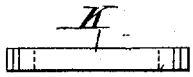
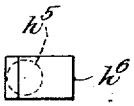
Fig. 8.
Fig. 7.
Inventor:
Albert A Martell
by Ramsey and Parmelee
Attys.
THE NORRIS PETERS CO., PHOTO-LITHO., WASHINGTON, D. C.

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

TOOL FOR ALINING AND FINISHING SHAFT-BEARINGS AND THE LIKE.

14,311. Specification of Reissued Letters Patent. Reissued June 5, 1917.

Original No. 1,135,460, dated April 13, 1915, Serial No. 788,536, filed September 8, 1913. Application for reissue filed March 13, 1917. Serial No. 154,634.

*To all whom it may concern:*

Be it known that I, ALBERT A. MARTELL, formerly of Boston, Massachusetts, and now a resident of the city of Woonsocket, in the county of Providence, State of Rhode Island, have invented a new and useful Tool for Alining and Finishing Shaft-Bearings and the like, of which the following is a specification.

The main object of my invention is to provide means for accurately positioning a tool for finishing bearings for shafts and the like and my invention consists mainly in a temporary bearing having a member eccentrically arranged so that it may be moved to give exact adjustment with reference to fixed working points.

A further and primary object of my invention includes the method of alining permanent bearings or openings by extending the shaft of a forming tool through the permanent bearings or openings to be alined, then temporarily rigidly supporting the shaft of the forming tool within the permanent bearings or opening with the axis of the shaft coincident with a predetermined mathematical line and then operating the shaft to cause the forming tool to shape the interior of the bearing or opening concentric with the predetermined mathematical line.

Other features of my invention are embodied in details of the tool.

Figure 1:
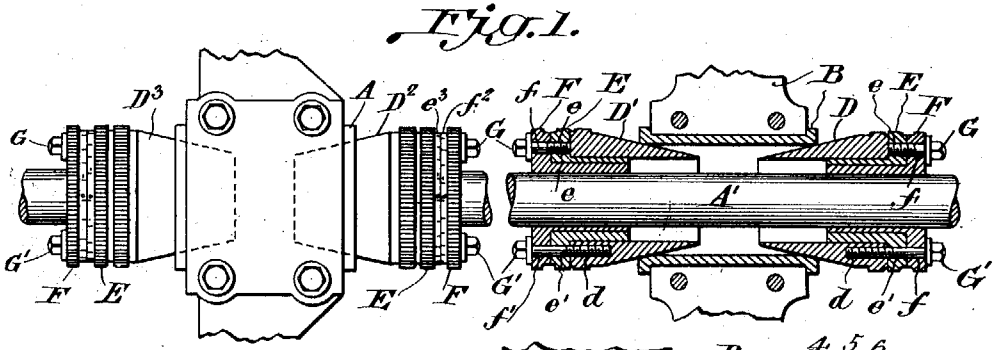
Figure 2:
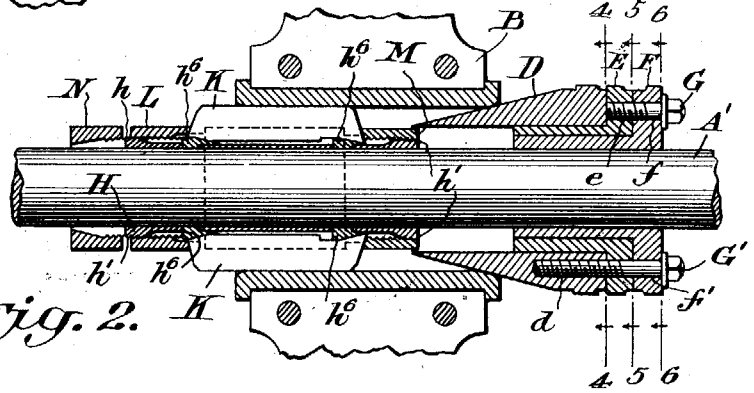

In the drawings: Figure 1 is an elevation partly in section, illustrating the temporary bearings; Fig. 2 is a section on a larger scale illustrating my tool in use; Fig. 3 is a detail of the shank of the reamer; Figs. 4, 5 and 6 are sections on lines 4—4, 5—5 and 6—6 respectively of Fig. 2; Fig. 7 is a plan on a larger scale of the wedge member; and Fig. 8 is a plan of one of the blades.

I disclose my invention as embodied in a tool for reaming the bearings of a crank shaft of an automobile engine but my tool may be used for a great variety of purposes.

A and B represent two of the bearings of a crank shaft although there may be more such bearings in line.

D, D′, $D^2$ and $D^3$ represent bushings whose exterior surfaces are conical and each having a threaded hole *d*. Fitting within each of the bushings is flanged sleeve E having screw threaded hole *e* and semi-circular slot *e′*. Fitting within sleeve E is another flanged sleeve F having two semi-circular slots *f f′*. Screw G passes through slot *f* and engages the threading in hole *e* and screw G′ passes through slots *f′* and *e′* and engages the threading in hole *d*, these screws holding the bushing and the two sleeves in their proper position when finally adjusted. If desired an additional threaded hole *d′* may be provided in member D and an additional threaded hole $e^2$ in member E in order to provide for holding in other rotative positions. The inner sleeve has a scale at $f^2$ consisting of, for example, 20 graduations, while sleeve E has scale portion $e^3$ having, for example, 19 graduations so that relative movement of these scale portions which brings graduation 1 on one scale opposite graduation 1 on the other will indicate that movement of say one-thousandth of an inch will have been given to the shaft as hereinafter pointed out.

It will be noted that the exterior of member F is eccentric to its interior which fits shaft A′ and that the interior of member E is eccentric to its exterior and these eccentricities are preferably about equal.

When the zero of the scale $f^2$ on the sleeve F is opposite the zero of the scale $e^3$ on the sleeve E the exterior of the bushing E is concentric with the axis of the shaft A′, and also under this condition if the conical surface of the bushing, for example the surface D, be extended the apex or point of the cone would lie in the axis of the shaft A′.

When the shaft has been properly positioned or alined the reaming tool is applied and this consists in the shank H threaded at *h* and *h′* and having boss $h^2$ in which are a plurality of recesses $h^3$ to receive and hold the blades K. At the bottom of each recess $h^3$ are two holes $h^4$ $h^4$ to receive the circular portion $h^5$ of wedge members $h^6$ which are removably mounted in the recesses $h^3$, swinging movement being prevented by the side walls of the slot and longitudinal movement by the engagement of portion $h^5$ in hole $h^4$. These wedge members give a very large movement of the blades away from the shank in proportion to a very small movement along the shank and this is an important feature of compactness in my device, and the removability of the wedge member provides an easy means of making sure that the wedge surface will always be accurate by substituting a new wedge as desired and in this way I do away with the necessity of truing the shank itself. Nuts L and M are interiorly threaded to engage threaded portions $h$ $h'$ and engage the blades to hold them in position. One end of the shank H is split at a plurality of points such as $h^7$ $h^7$ and the outer end of the shank is engaged by nut N so that when the nut is screwed to the right in Fig. 2 the shank will be clamped firmly against the shaft A′.

As clearly appears in Figs. 4 and 5 shaft A′ is non-concentric with the outer surface of sleeve F and this provides what is in effect a wedge action when the sleeve or sleeves are rotated in order to force the axis of the shaft into the desired position.

Because of the eccentricity of the outer surface of the sleeve F and the inner surface of the sleeve E relatively to the inner surface of the conical bushings and to the axis of the shaft A′ it is obvious that rotation of these sleeves relatively to each other enables the positioning of the axis of the shaft at any point within a circle whose center is the axis of the conical bushing and whose diameter is the sum of the eccentricities of the bushings E and F. For example, if the eccentricity of the exterior of the bushing F to the center of the shaft is 3/64 of an inch and the eccentricity of the interior of the bushing E is 3/64 of an inch relative to the exterior of the bushing E, or the interior of the bushing D, then by relative rotation of the sleeves E and F the center of the shaft may be positioned at any point within the circumference of a circle whose center is the axis of the bushing D and whose diameter is 3/32 of an inch.

In using my device I place one of the temporary bearings, for example D, including the sleeves and conical bushing, on the end of the shaft A′, then thread the shaft through the permanent bearings A and B to be reamed, and then thread the other temporary bearings on the shaft as it passes through the permanent bearings in such manner as to provide a pair of temporary bearings to be inserted in each permanent bearing to be reamed. I then place the end temporary bearings, for example D and $D^3$, Fig. 1, in position in the permanent bearings. When a temporary bearing is first inserted it is preferable that the scales be set with the zeros opposite.

I then rotate the two sleeves of each temporary bearing within their bushing with such movement with relation to each other as may be required until the axis of the shaft is at the exact distance required from the two working points, such for example, as the cylinders and the gear shaft or shafts.

I then adjust the other pair of temporary bushings beginning with, for example D′. This may be done by starting with the two zeros opposite on the scales $e^3$ and $f^2$, then turning one or both sleeves and at the same time moving the conical portion solidly into the permanent bearing. When this has been accomplished I continue turning the sleeves until the sleeves bind on the shaft. This might show a variation of three scale graduations as compared to the reading on the scale of the companion bushing set in the same permanent bearing. In which case I turn the sleeve back about half of the distance covered in the forward rotation. This divides any slight inaccuracy and is sufficiently accurate for this bearing and this same thing is done with the bearing having bushing $D^2$. When the shaft has been thus accurately positiond it is partially withdrawn and one of the temporary bearings such as that with the bushing D is removed. The reaming tool is applied to the shaft and brought into position for reaming. When the bearing has been reamed to the extent shown in Fig. 2 the bearing having bushing D′ is removed from the bearing B and the reamer, having itself now become properly centered, will continue the reaming until the whole bearing is finished. Any suitable means may be provided for rotating the reamer. When one bearing has been finished the temporary bearings may be reinserted and the other bearing or bearings may be finished in similar fashion.

From the foregoing specific description it will be noted that the present invention includes a method of alining bearings by supporting the tool, which alines the bearing, by the bearing itself. In this method it is desirable to locate a predetermined point of departure, which, as above explained, may comprise an exact distance from two working points such as a plane determined by axes of the cylinders of an engine and a line determined by the axis of a cam shaft. After determining this point of departure the axis of the forming tool is alined to include this point of departure and then the shaft is operated to cut or shape the bearings concentric with the axis of the shaft. During this operation the method further contemplates the removal of the temporary bearings from the permanent bearing being reamed and after readjusting the temporary bearings, to cause the axis of the inner bore to be concentric to the conical outer surface, the temporary bearings are replaced in the reamed permanent bearing to support and guide the shaft while the remaining permanent bearings are being alined.

I do not make claim in this application for the subject-matter of the reamer as I intend to make that the subject of a separate application.

What I claim is:

1. A temporary bearing comprising an exteriorly conical bushing, a sleeve rotatably mounted within the conical bushing, and a second sleeve rotatably mounted within the first sleeve and having a bore eccentrically disposed with relation to the exterior of said second sleeve.

2. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve.

3. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve, and a tool for said shaft for operating upon the bearing to be finished.

4. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve and means for fastening the two sleeves together and to the bushing in their adjusted relative positions.

5. A device of the character described comprising a shaft adapted to carry a tool; a plurality of temporary bearings for said shaft, each comprising an exteriorly conical bushing, a sleeve rotatably mounted within the conical bushing, and a second sleeve rotatably mounted within the first sleeve and made with a shaft receiving bore eccentrically disposed with relation to the exterior of said second sleeve, said exterior being eccentric to the exterior of the first sleeve.

6. A temporary bearing comprising a member adapted for connection to a permanent bearing; a second member rotatably mounted in the first member; and a third member rotatably mounted in the second member and having a bore eccentrically disposed with relation to the exterior of said third member.

7. A device for alining and finishing shaft bearings and the like comprising, in combination, temporary bearing supports adapted to be inserted within the permanent bearings to be alined, a shaft, shaft bearings for said shaft and carried by said supports, means for adjusting said shaft bearings to adjust the axis of said shaft to a position coincident with the axis to which the permanent bearings are to be alined, and a forming tool carried by said shaft for alining said permanent bearings concentric with said axis.

8. In a device for alining and finishing shaft bearings and the like, the combination of a shaft bearing support constructed to be carried by permanent bearings that are to be alined, a forming tool shaft, a shaft bearing for said forming tool shaft, adjustable means carried by said support and adjustable to adjust the axis of the shaft to any point within a predetermined area within said permanent bearings, and a forming tool to shape the said permanent bearings concentric with the axis of the said shaft.

9. A temporary bearing comprising a member adapted for connection to a permanent bearing, a second member adjustably mounted relatively to the first member, and a third member adjustably mounted relatively to said second member, a forming tool shaft carried by said third member, and a forming tool upon said forming tool shaft.

10. A temporary bearing comprising an exteriorly conical bushing, a sleeve rotatably mounted within said conical bushing and having an opening eccentric to the opening in the conical bushing, and a second sleeve rotatably mounted within the opening in the first sleeve and having a bore eccentrically disposed with relation to the exterior of the second sleeve.

11. A device of the character described, comprising a shaft adapted to carry a tool, a plurality of temporary bearings for said shaft, each comprising an exteriorly conical bushing, a sleeve rotatably mounted within said conical bushing and being provided with an opening eccentric to the exterior of the sleeve, a second sleeve rotatably mounted within said first sleeve and having a shaft receiving bore eccentrically disposed with relation to the exterior of the second sleeve.

12. As an article of manufacture, a temporary bearing comprising a member adapted to be inserted in a permanent bearing, a work shaft bearing, and means carried by the member to permit the work shaft bearing to be adjusted relatively to the axis of the said member.

13. As an article of manufacture, a temporary bearing comprising a conical bushing adapted to be inserted in a permanent bearing, a work shaft bearing, and adjustable devices operatively connecting the bushing and the shaft bearing to permit of adjustment of the shaft bearing relatively to the conical bushing.

14. The method of alining permanent bearings, which method comprises extending the shaft of a forming tool through the permanent bearings to be alined; then temporarily rigidly supporting the said shaft by and within said permanent bearings; adjusting said shaft to render the axis of said shaft coincident with a predetermined mathematical line; and then operating the shaft to cause the forming tool to shape the interior of said bearings concentric with the said predetermined mathematical line.

15. The method of alining bearings, which method comprises extending the shaft of a forming tool through the bearings to be alined; then temporarily rigidly supporting the said shaft by and within the said bearings; and then operating the shaft to cause the forming tool to shape the interior of said bearings concentric with the axis of the shaft.

16. The method of alining and finishing permanent shaft bearings, which comprises determining a line with which the permanent bearings are to be alined; supporting a reamer carrying shaft within the permanent bearings; alining the axis of the reamer carrying shaft with the said line; and then operating the reamer to ream the permanent bearings to aline the axis of the reamed bearings with the said line.

17. The method of alining and finishing permanent shaft bearings and the like, which comprises supporting a reamer carrying shaft by mounting temporary bearings within the permanent bearings; alining the axis of the reamer shaft with the line to which the axis of the permanent bearings are to be alined; operating the reamer shaft to seat the reamer in one of the permanent bearings; removing the temporary bearing from the permanent bearing being reamed after the reamer is securely seated therein and then continuing the reaming operation to completion; and then replacing the temporary bearing in the reamed bearing and proceeding with each bearing in like manner until all of the permanent bearings have been reamed.

18. The method of finishing and alining permanent shaft bearings, which comprises securing a plurality of adjustable temporary bearings within the permanent bearings; alining the axis of the temporary bearings with a line with which the permanent bearings are to be alined; mounting a reamer carrying shaft within the temporary bearings and operating the reamer carrying shaft to securely seat the reamer in a permanent bearing; then removing the temporary bearing from the permanent bearing being reamed; and then replacing the temporary bearing in the reamed bearing and proceeding with each bearing in like manner until all of the permanent bearings have been reamed.

19. The method of alining and reaming a plurality of permanent bearings, which consists in supporting a reamer shaft within the said permanent bearings; adjusting the reamer shaft so that the axis of the reamer shaft is coincident with the axis to which the permanent bearings are to be alined; and then operating the reamer shaft to form the permanent bearings concentric with the predetermined axis.

ALBERT A. MARTELL.

Copies of this patent may be obtained for five cents each, by addressing the "Commissioner of Patents, Washington, D. C."